(12) United States Patent
He et al.

(10) Patent No.: US 8,837,351 B2
(45) Date of Patent: Sep. 16, 2014

(54) METHOD AND UE FOR SETTING A HAPPY BIT ON AN UPLINK E-DPCCH

(75) Inventors: Meifang He, Shenzhen (CN); Xiang Cheng, Shenzhen (CN); Yu Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 297 days.

(21) Appl. No.: 13/257,864

(22) PCT Filed: Mar. 5, 2010

(86) PCT No.: PCT/CN2010/070889
§ 371 (c)(1),
(2), (4) Date: Feb. 7, 2012

(87) PCT Pub. No.: WO2011/020318
PCT Pub. Date: Feb. 24, 2011

(65) Prior Publication Data
US 2012/0120886 A1    May 17, 2012

(30) Foreign Application Priority Data

Aug. 17, 2009 (CN) .......................... 2009 1 0163152

(51) Int. Cl.
*H04W 52/12* (2009.01)
*H04W 52/26* (2009.01)
*H04W 72/04* (2009.01)
*H04W 72/12* (2009.01)

(52) U.S. Cl.
CPC ............ *H04W 52/262* (2013.01); *H04W 52/12* (2013.01); *H04W 72/12* (2013.01); *H04W 72/0413* (2013.01)
USPC ............................ 370/318; 370/329; 455/522

(58) Field of Classification Search
USPC ......... 370/329–330, 335–337, 395.4, 395.41, 370/395.42, 395.43, 468; 455/522
See application file for complete search history.

(56) References Cited

U.S. PATENT DOCUMENTS

2009/0093256 A1    4/2009   Kawamoto et al.
2010/0111023 A1*   5/2010   Pelletier et al. ............... 370/329

FOREIGN PATENT DOCUMENTS

| CN | 101026799 A  | 8/2007 |
| CN | 101114857 A  | 1/2008 |
| CN | 101409924 A  | 4/2009 |
| JP | 2009094637 A | 4/2009 |
| KR | 1020070040693 A | 4/2007 |

OTHER PUBLICATIONS

3GPP TS 25.321 V8.6.0, Medium Access Control (MAC) protocol specification(Release 8) Jun. 30, 3009.

(Continued)

*Primary Examiner* — Hoon J Chung
(74) *Attorney, Agent, or Firm* — Oppedahl Patent Law Firm LLC (57) ABSTRACT

A method and UE for setting a Happy bit on an uplink enhanced dedicated control channel are provided. The method includes: a UE transmits an uplink Enhanced Dedicated Channel (E-DCH) on more than one carrier, when criterion 1 and criterion 2 are met, the UE sets the Happy bit which is to be transmitted to a network side as "UNHAPPY" to indicate that the UE doesn't satisfy with the current serving grant. The disclosure optimizes the processing process of power control and resource scheduling, reduces call-drop rate, so that the performances of the UE and the NodeB are optimized.

6 Claims, 6 Drawing Sheets

(56) References Cited

OTHER PUBLICATIONS

Qualcomm Europe, Scheduling Information and Happy Bit Feedback in DCHSUPA, 3GPP TSG RAN WG2#66 R2-092996 May 4, 2009.
Ericsson, Happy Bit and Scheduling Information for DC-HSUPA, 3GPP TSG RAN WG2#66 R2-092941 May 4, 2009.
Huawei, Considerations on Happy Bit for DC-HSUPA, 3GPP TSG RAN WG2 Meeting#66 R2-093153 May 4, 2009.
International Search Report in international application No. PCT/CN2010/070889, mailed on Jun. 17, 2010, pp. 27-30 of WIPO Publication (Non-English version) of PCT/CN2010/070889, submitted on Sep. 20, 2011.
English Translation of the Written Opinion of the International Search Authority in international application No. PCT/CN2010/070889, mailed on Jun. 17, 2010.
Supplementary European Search Report in European application No. 10809451.7, mailed on Jan. 2, 2014.

\* cited by examiner

METHOD AND UE FOR SETTING A HAPPY BIT ON AN UPLINK E-DPCCH

TECHNICAL FIELD

The disclosure relates to the field of resource scheduling on a Uu interface (i.e. an interface between a base station and a UE) in a Wideband Code Division Multiple Access (WCDMA) communication system, in particular to a method and UE for setting a Happy bit on an uplink E-DCH Dedicated Physical Control Channel (E-DPCCH).

BACKGROUND

A wireless side uplink enhanced technology is introduced to an existing system to achieve a High Speed Uplink Packet Access (HSUPA) function. HSUPA adopts the technologies such as physical layer fast retransmission and soft combination (i.e. Hybrid Automatic Repeat Request, HARQ for short below), NodeB distributed scheduling, a shorter Transmission Time Interval (TTI), high-order modulation, and the like, so that the maximum uplink data throughput rate of a single cell reaches 5.76 Mbit/s, the data service bearing capacity and the spectrum utilization rate of a WCDMA uplink are thus greatly enhanced. In order to support HSUPA, a Media Access Control (MAC) layer includes an MAC-es/MAC-e entity, thus each UE is provided with an uplink Enhanced Dedicated Channel (E-DCH) for connecting itself with a NodeB. In order to make the E-DCH support the variable size of a Radio Link Control Protocol Data Unit (RLC PDU), an MAC-is/MAC-i entity is further introduced to MAC, so MAC-is/MAC-i also supports the functions of the E-DCH. In order to support HSUPA, a physical layer is added with an uplink E-DCH Dedicated Physical Control Channel (E-DPCCH) and an uplink E-DCH Dedicated Physical Data Control Channel (E-DPDCH) on uplink, and with a downlink E-DCH Absolute Grant Channel (E-AGCH), a downlink E-DCH Relative Grant Channel (E-RGCH) and a downlink E-DCH HARQ Acknowledgement Indicator Channel (E-HICH) on downlink; wherein the E-DPDCH is used for bearing uplink transmitted data of an HSUPA user; the E-DPCCH is used for bearing and demodulating adjoint signaling of the uplink E-DPDCH; the E-AGCH is a common channel, which is used by a cell where a user service E-DCH wireless connection exists to indicate the maximum available power offset of the E-DPDCH of UE, and the regulation is usually slow; the E-RGCH is a dedicated channel which can regulate uplink available power of UE (User Equipment) quickly (the shortest time is 2 ms); and the E-HICH is used for returning ACK/NACK information indicating whether users correctly receive process data.

A Happy bit in the E-DPCCH is used for indicating that whether UE satisfies with the current Serving Grant (SG). In the case of a single carrier, if the following three unhappy criteria are met at the same time, then UE indicates the current service as "UNHAPPY", and if the criteria are not met at the same time, then UE indicates the current service as "HAPPY":

1. UE is transmitting as much scheduled data as the maximum allowed by the current SG;
2. UE has enough power available to transmit data at higher rate; and
3. Data are transmitted in the same TTI as the Happy bit based on the same power offset as the one selected in Enhanced Uplink Transmission Format Combination (E-TFC) selection and with the multiplying of the current SG by the ratio of the number of active HARQ processes to the total number of HARQ processes, and the Total E-DCH Buffer Status (TEBS) would require a time longer than a Happy bit delay criterion (Happy_Bit_Delay_Condition, with a unit of ms).

The criterion 1 is always true for a deactivated process and the ratio of the number of active HARQ processes to the total number of HARQ processes in the criterion 3 is always 1 for a 10-ms TTI.

In the criterion 2, in order to estimate whether UE has enough power available to support higher data transmission rate, the UE makes a determination according to two criteria below:

a) if MAC-i/MAC-is configured, identifying the E-TFC that has a transport block size at least 32 bits larger than the transport block size of a selected E-TFC in a TTI same as the Happy bit; and if MAC-i/MAC-is not configured, identifying the E-TFC that has a transport block size at least X bits larger than that of a selected E-TFC in a TTI same as the Happy bit, wherein X is the smallest Radio Link Control Protocol Data Unit (RLC PDU) size configured among all the logical channels which do not belong to non-scheduled MAC-d flows and have data in buffer;

b) Data are transmitted in the same TTI as the Happy bit based on the same power offset as the one selected in E-TFC selection, and whether the identified E-TFC (namely the E-TFC determined in criterion a) is supported or not is checked, such as it is not blocked.

At present, the numerical meaning of the Happy bit defined by the system is shown in Table 1:

TABLE 1

| mapping of the Happy bit in the case of a single carrier | | | |
|---|---|---|---|
| for a single carrier, determining whether the three criteria for unhappy are all met | Happy bit for a single carrier | Mapping value of Happy bit for a single carrier | Happy state of UE |
| Yes | UNHAPPY | 0 | UNHAPPY |
| No | HAPPY | 1 | HAPPY |

A NodeB scheduler can know whether UE performs transmission with the largest allocation power according to the Happy bit on the E-DPCCH, thus determining whether to increase, decrease or keep a given UE allocation power. If the Happy bit on the E-DPCCH is "UNHAPPY", the NodeB may increase the UE allocation power. If the Happy bit on the E-DPCCH is "HAPPY", the NodeB can only decrease or keep the given UE allocation power. If the current transmission power of UE in several TTIs is lower than the current maximum value, then the allocation power thereof should be decreased.

As the supplementation to downlink Dual Cell-High Speed Packet Access (DC-HSDPA), the technology of dual carrier aggregation is introduced to uplink. The dual carriers belong to the same NodeB and are adjacent; and the total number of HARQ processes on the two carriers are the same, and the operation is used for configuring at least two carriers on the downlink at the same time. Since the uplink adopts double carriers, for every E-DCH transmission, two E-DPCCH physical channels need to be treated on a network side at the same time, then there are two Happy bits reported at the UE. If the Happy state of the UE is still set according to the unhappy criterion in the case of a single carrier of the present system, the phenomenon may appear that the Happy bit of the UE on one carrier is "HAPPY", and that on the other carrier is "UNHAPPY", thus the NodeB can not distinguish the Happy state of the UE.

SUMMARY

In order to solve the problems in the related technologies, this disclosure provides a method and a UE for setting a Happy bit on an uplink E-DCH dedicated physical control channel (E-DPCCH) to make a NodeB obtain the Happy state of the UE, so as to distribute resources reasonably.

In order to solve the problems, this disclosure provides a method for setting a Happy bit on an uplink E-DCH dedicated physical control channel, which includes: a UE transmits an Enhanced Dedicated Channel (E-DCH) on more than one carrier, when criterion 1 and criterion 2 are met, the UE sets a Happy bit which is to be transmitted to a network side as "UNHAPPY" to indicate that the UE does not satisfy with the current serving grant, and the criteria are as follows:

criterion 1: at least one carrier exists, the UE is transmitting as much data on the at least one carrier as the maximum scheduled data allowed by the current serving grant in Enhanced Uplink Transmission Format Combination (E-TFC) selection on the carriers, and the UE has enough power on the at least one carrier to transmit data at higher rate; and criterion 2: in a Transmission Time Interval (TTI) same as the Happy bit, data are transmitted based on a power offset the same as a power offset selected in current E-TFC selection and with the sum of transmission factors on each carrier, the transmission factors on each carrier being obtained by multiplying the serving grant of the carrier by the ratio of the number of active hybrid automatic repeat request processes to the total number of hybrid automatic repeat request processes, and Total E-DCH Buffer Status (TEBS) would require a time longer than Happy_Bit_Delay_Condition.

The method may further include: when the criterion 1 and/or criterion 2 are/is not met, the UE sets the Happy bit as "HAPPY" to indicate that the UE satisfies with the current serving grant.

The method may further have following features: in the criterion 1, the UE has enough power to transmit data at higher rate on the at least one carrier when criterion a) and criterion b) below are met:

a) if MAC-i/is configured, E-TFC of the at least one carrier is identified, making a transport block size of the E-TFC identified on the carrier larger than that of a selected E-TFC of the carrier in a TTI same as the Happy bit by at least a given value which is greater than or equal to 16 bits; and if MAC-i/is not configured, E-TFC of the at least one carrier is identified, making a transport block size of the identified E-TFC larger than that of a selected E-TFC of the carrier in a TTI same as the Happy bit by at least X bits, wherein X is the smallest Radio Link Control Protocol Data Unit (RLC PDU) size configured among all the logical channels which belong to scheduled MAC-d flows and have data in buffer;

b) in the transmission time interval same as the Happy bit, data are transmitted based on a power offset the same as the one selected in E-TFC selection, and the identified E-TFC of the at least one carrier in criterion a) is supported.

The above method may further have following features: in the criterion 1, the at least one carrier includes a primary carrier and an secondary carrier, wherein data that the UE is transmitting on the primary carrier and the secondary carrier is respectively as much as the maximum scheduled data allowed by current serving grant in E-TFC selection on the primary carrier and the secondary carrier, and the UE has enough power on the primary carrier and the secondary carrier to transmit data at higher rate when two criteria below are met:

a) if MAC-i/is configured, E-TFC of the primary carrier and E-TFC of the secondary carrier are identified, making the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in a transmission time interval same as the Happy bit by at least a given value which is greater than or equal to 16 bits; and if MAC-i/is not configured, E-TFC of the primary carrier and E-TFC of the secondary carrier are identified, making the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in the transmission time interval same as the Happy bit by at least X bits, wherein X is the smallest RLC PDU size configured among all the logical channels which belong to scheduled MAC-d flows and have data in buffer;

b) in a transmission time interval same as the Happy bit, data are transmitted based on a power offset the same as the one selected in E-TFC selection, and the E-TFC of the primary carrier and the E-TFC of the secondary carrier, which are identified in criterion a), are supported.

The above method may further have following features: in the criterion 2, the UE sends data with the multiplying of the sum of serving grants of the current carriers by the ratio of the number of active hybrid automatic repeat request processes to the total number of hybrid automatic repeat request processes.

The disclosure further provides a UE which is configured to transmit an uplink Enhanced Dedicated Channel (E-DCH) on more than one carrier, and to set a Happy bit which is to be transmitted to a network side as "UNHAPPY" when criterion 1 and criterion 2 are met, so as to indicate that the UE does not satisfy with the current serving grant, wherein the criteria are as follows:

criterion 1: at least one carrier exists, of the UE is transmitting data on the at least one carrier as much as the maximum scheduled data allowed by the current serving grant in Enhanced Uplink Transmission Format Combination (E-TFC) selection on the carrier, and the UE has enough power on at least one carrier to transmit data at higher rate; and criterion 2: in the transmission time interval same as the Happy bit, data are transmitted based on a power offset the same as the one selected in current E-TFC selection and with the sum of transmission factors on each carrier, the transmission factors on each carrier being obtained by multiplying of the serving grant of the carrier by the ratio of the number of active hybrid automatic repeat request processes to the total number of hybrid automatic repeat request processes, and Total E-DCH Buffer Status (TEBS) would require a time longer than Happy_Bit_Delay_Condition.

The above UE may further have following features: the UE is configured to set the Happy bit as "HAPPY" to indicate that the UE satisfies with the current serving grant when the criterion 1 and/or criterion 2 are not met.

The above UE may further have following features: when criterion a) and criterion b) below are met, the UE is configured to determine it has enough power to transmit data at higher rate on the at least one carrier when criterion a) and criterion b) below are met:

a) if MAC-i/is configured, E-TFC of the at least one carrier is identified, making a transport block size of the E-TFC identified on the carrier larger than a transport block size of a selected E-TFC of the carrier in a TTI same as the Happy bit by at least a given value which is greater than or equal to 16 bits; and if MAC-i/is not configured, E-TFC of the at least one carrier is identified, making a transport block size of the identified E-TFC larger than a transport block size of a selected E-TFC of the carrier in a TTI same as the Happy bit by at least X bits, wherein X is the smallest Radio Link Control Protocol Data Unit (RLC PDU) size configured among all the logical channels which belong to scheduled MAC-d flows and have data in buffer;

b) in the transmission time interval same as the Happy bit, data are transmitted based on a power offset the same as the one selected in E-TFC selection, and the identified E-TFC of the at least one carrier in criterion a) is supported.

The above UE may further have the following features: the at least one carrier includes a primary carrier and an secondary carrier, wherein the UE is further configured to determine it has enough power to transmit data at higher rate on the primary carrier and the secondary carrier if data that the UE is transmitting on the primary carrier and the secondary carrier is respectively as much as the maximum scheduled data allowed by current serving grant in E-TFC selection on the primary carrier and the secondary carrier and when the UE meets two criteria below:

a) if MAC-i/is configured, E-TFC of the primary carrier and E-TFC of the secondary carrier are identified, making the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in a TTI same as the Happy bit by at least a given value which is greater than or equal to 16 bits; and if MAC-i/is not configured, E-TFC of the primary carrier and E-TFC of the secondary carrier are identified, making that the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in a same transmission time interval as the Happy bit by at least X bits, wherein X is the smallest RLC PDU size configured among all the logical channels which belong to scheduled MAC-d flows and have data in buffer;

b) in the same transmission time interval as the Happy bit, data are transmitted based on a power offset is the same as a power offset selected in E-TFC selection, the E-TFC of the primary carrier and the E-TFC of the secondary carrier, which are identified in criterion a), are supported.

The above UE may further have following features: the UE is configured to transmit data with multiplying of the sum of serving grants of current carriers by the ratio of the number of active hybrid automatic repeat request processes to the total number of hybrid automatic repeat request processes when the number of hybrid automatic repeat request processes activated on each carrier is the same.

To sum up, this disclosure provides a method for setting a Happy bit. The disclosure synthesizes the criteria of a primary carrier and an secondary carrier to determine a Happy bit, so that the Happy state information of a UE can be reflected accurately and supplied to a NodeB to enable the NodeB to clearly know that whether the UE is in a happy state or in an unhappy state, and the process will not be caused to be abnormal; besides, the power control and resource scheduling processing procedure is optimized, the call-drop rate is reduced, thereby performances of the UE and the NodeB are improved.

DETAILED DESCRIPTION

Next, the implementation of the technical scheme of this disclosure is further detailed in combination with the drawings.

This disclosure provides a method for setting a Happy bit under a Double Carrier (DC) mode by a UE, determining the Happy bit based on a comprehensive consideration of a primary carrier and an secondary carrier, and enabling a NodeB to learn whether the UE satisfies with the current service under the DC mode when the UE sends an E-DCH under the DC mode in a wireless communication system of the high speed packet access technology.

This disclosure provides a method for setting a Happy bit on an uplink E-DCH dedicated physical control channel; a UE transmits an uplink Enhanced Dedicated Channel (E-DCH) on more than one carrier and sets the Happy bit according to the criteria below; when the criteria below are met, the UE sets the Happy bit which is to be transmitted to a network side as "UNHAPPY" to indicate that the UE does not satisfy with the current serving grant; when the criteria are not met, the UE sets the Happy bit as "HAPPY"; and the criteria specifically include:

criterion 1: at least one carrier exists, the UE is transmitting data on the carrier as much as the maximum scheduled data allowed by the current SG in E-TFC selection on the carrier, and the UE has enough power on the carrier to transmit data at higher rate;

wherein it indicates that the UE has enough power on the carrier to send data at higher rate when the following criteria a1 and b1 are met;

a1) if MAC-i/is configured, E-TFC of the carrier is identified, making a transport block size larger than that of a selected E-TFC of the carrier in a same TTI as the Happy bit by at least a given value which is greater than or equal to 16 bits; and if MAC-i/is not configured, E-TFC of the carrier is identified, making a transport block size of the identified E-TFC larger than that of a selected E-TFC of the carrier in a TTI same as the Happy bit by at least X bits, wherein X is the smallest RLC PDU size configured among all the logical channels which belong to scheduled MAC-d flows and have data in buffer;

b1) in a TTI same as the Happy bit, data are transmitted based on a power offset the same as a power offset selected in E-TFC selection; and it is checked whether the identified E-TFC (namely, the E-TFC identified in criterion a1) is supported, such as it is not blocked, and if supported, it indicates that criterion b1 is met.

The carrier can be a primary carrier and/or an secondary carrier.

if the data being transmitted by the UE on the primary carrier is as much as the maximum scheduled data allowed by the current SG in E-TFC selection on the carrier, and so is it on the secondary carrier, not only can the criteria a1 and b1 above be used for determining whether the UE has enough power on the primary carrier and the secondary carrier to send data at higher rate, but also can the criteria a2 and b2 below be used for this determination; and it indicates that the UE has enough power on the primary carrier and the secondary carrier to send data at higher rate when the UE meets the criteria a2 and b2:

a2) if MAC-i/is configured, E-TFC on the primary carrier and E-TFC on the secondary carrier are identified, making the sum of a Transport Block 1 (TB1) size of the identified E-TFC on the primary carrier and a Transport Block 2 (TB2) size of the identified E-TFC on the secondary carrier larger than the sum of a TB1 size of a selected E-TFC on the primary carrier and a TB2 size of a selected E-TFC on the secondary carrier in a TTI same as the Happy bit by at least a given value which is greater than or equal to 16 bits; and if MAC-i/is not configured, E-TFC on the primary carrier and E-TFC on the secondary carrier are identified, making the sum of a transport block 1 size of the identified E-TFC on the primary carrier and a Transport Block 2 size of the identified E-TFC on the secondary carrier larger than the sum of a transport block 1 size of a selected E-TFC on the primary carrier and a Transport Block 2 size of a selected E-TFC on the secondary carrier in a TTI same as the Happy bit by at least X bits, wherein X is the smallest RLC PDU size configured among all the logical channels which belong to scheduled MAC-d flows and have data in buffer;

b2) in the TTI same as the Happy bit, data are transmitted based on a power offset the same as a power offset selected in an E-TFC selection, and it is checked whether the identified E-TFCs (namely, E-TFC on the primary carrier and E-TFC on the secondary carrier identified in criterion a2) on the primary carrier and the secondary carrier are supported or not, such as it is not blocked.

criterion 2: in a TTI same as the Happy bit, data are transmitted based on a power offset the same as the one selected in current E-TFC selection and with the sum of transmission factors on each carrier, the transmission factors on each carrier being obtained by multiplying serving grant of each carrier by the ratio of the number of active hybrid automatic repeat request processes to the total number of hybrid automatic repeat request processes, and Total E-DCH Buffer Status (TEBS) would require a time longer than Happy_Bit_Delay_Condition.

When carriers include a primary carrier and an secondary carrier, data are transmitted with the sum of the product of multiplying the SG of the current primary carrier by the ratio of the number of active HARQ processes on the primary carrier to the total number of HARQ processes and the product of multiplying the SG of the current secondary carrier by the ratio of the number of active HARQ processes on the secondary carrier to the total number of HARQ processes, namely, data are transmitted according to the formula: SG of the primary carrier×the number of active HARQ processes on the primary carrier/the number of the total HARQ processes+SG of the secondary carrier×the number of active HARQ processes on the secondary carrier/the number of the total HARQ processes; and TEBS would require a time longer than Happy_Bit_Delay_Condition (ms).

When the number of active HARQ processes on both carriers are the same, the criterion 2 can be determined through the method below: in a TTI same as the Happy bit, data are transmitted based on a power offset same as a power offset selected in E-TFC selection and with the multiplying of the sum of the serving grants of the current carrier by the ratio of the number of active hybrid automatic repeat request processes to the total number of the hybrid automatic repeat request processes, and TEBS would require more than Happy_Bit_Delay_Condition (ms).

When carriers include a primary carrier and an secondary carrier, data are transmitted with the multiplying of the sum of SGs of the current primary carrier and secondary carrier by the ratio of the number of active HARQ processes to the total number of HARQ processes, namely data are transmitted according to the formula: (SG of the primary carrier+SG of the secondary carrier)×the number of active HARQ processes/the number of the total HARQ processes.

If the criterion 1 and the criterion 2 above are satisfied at the same time, the UE sets the Happy bit as "UNHAPPY", and if either criterion 1 or criterion 2 is met, the UE sets the Happy bit as "HAPPY", seeing Table 2.

TABLE 2 the UE determines the Happy state under the DC mode

| Whether comprehensive criteria for both the primary carrier and the secondary carrier are met or not | the Happy state of the UE |
|---|---|
| Yes | Unhappy |
| No | Happy |

Figure 1:
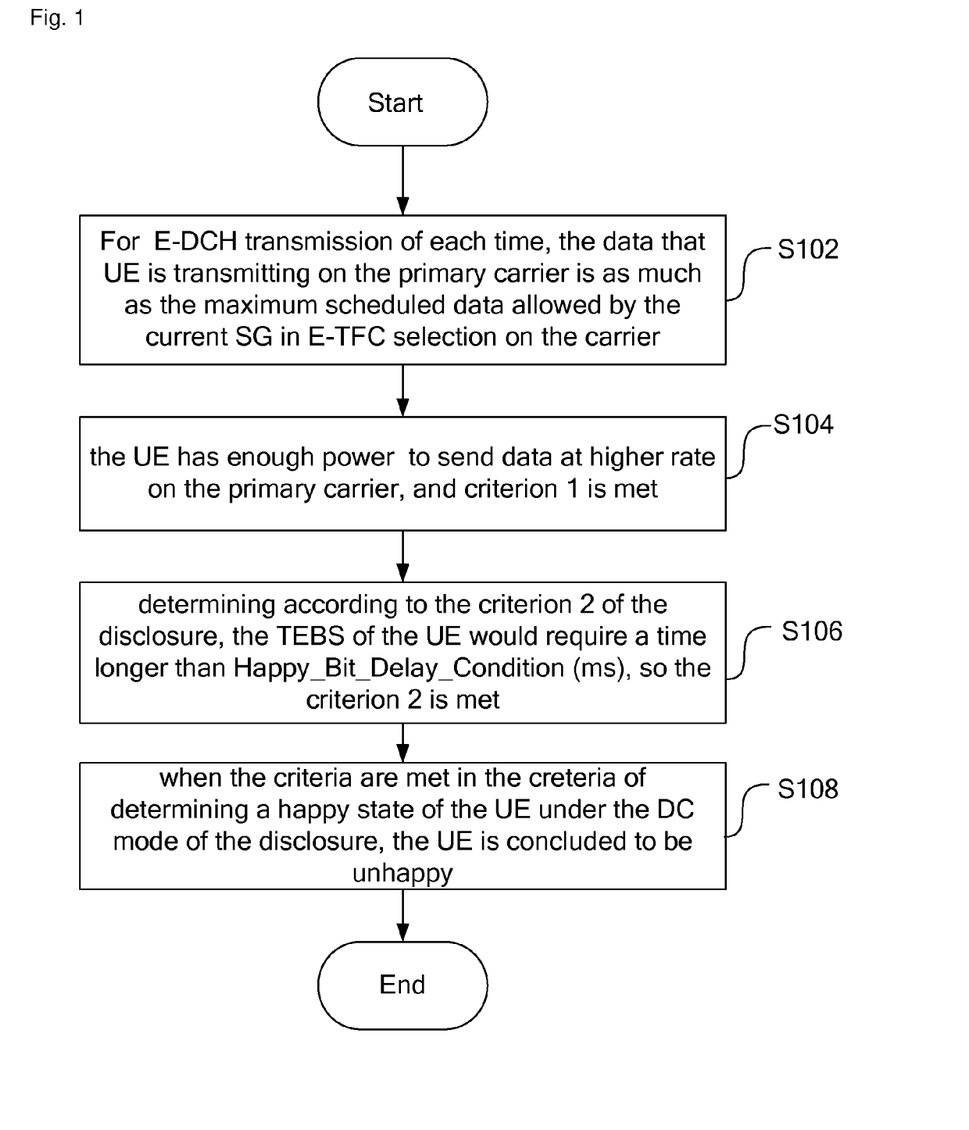
FIG. 1 is a diagram of Embodiment 1 of this disclosure.

FIG. 1 shows that data being transmitted on the primary carrier is as much as the maximum scheduled data allowed by the current SG in an E-TFC selection on the carrier; under the condition that the UE has enough power to send data at higher rate, the UE determines the unhappy criteria of the UE according to the criteria of determining Happy state of the UE under the DC mode, if two conditions are both met, the UE is believed as "UNHAPPY". The specific steps are as follows:

Step S102: when an E-DCH is transmitted, data that the UE is transmitting on the primary carrier is as much as the maximum scheduled data allowed by the current SG in E-TFC selection on the carrier;

Step S104: the UE has enough power on the primary carrier to send data at higher rate, and under the DC mode of this disclosure, the criterion 1 in the criteria of determining Happy state of the UE under the DC mode is met;

whether the UE has enough power on the primary carrier to send data at higher rate are determined specifically through the methods as follows: a) identifying E-TFC of the primary carrier which has a transport block size larger than a transport block size of a selected E-TFC in a TTI same as the Happy bit by at least a given value (which is greater than or equal to 16 bits), however, if the transport block size of the identified E-TFC is not larger than that of a selected E-TFC by a given value, identifying E-TFC of the primary carrier which has a transport block size larger than that of the selected E-TFC of the primary carrier in the TTI same as the Happy bit by at least X bits, wherein X is the smallest RLC PDU size configured among all the logical channels which belong to scheduled MAC-d flows and have data in buffer; and b) in a TTI same as the Happy bit, data are transmitted based on a power offset same as a power offset selected in E-TFC selection, and it is checked that the identified E-TFC of the primary carrier is supported.

Step S106: determining according to the method 2 of the criterion 3 in the criteria of determining Happy state of the UE under the DC mode of this disclosure, the TEBS of the UE would require a time longer than Happy_Bit_Delay_Condition (ms), so the criterion 2 is met.

Step S108: when the criteria are met in the criteria of determining Happy state of the UE under the DC mode of this disclosure, it is concluded that the UE is unhappy.

Figure 2:
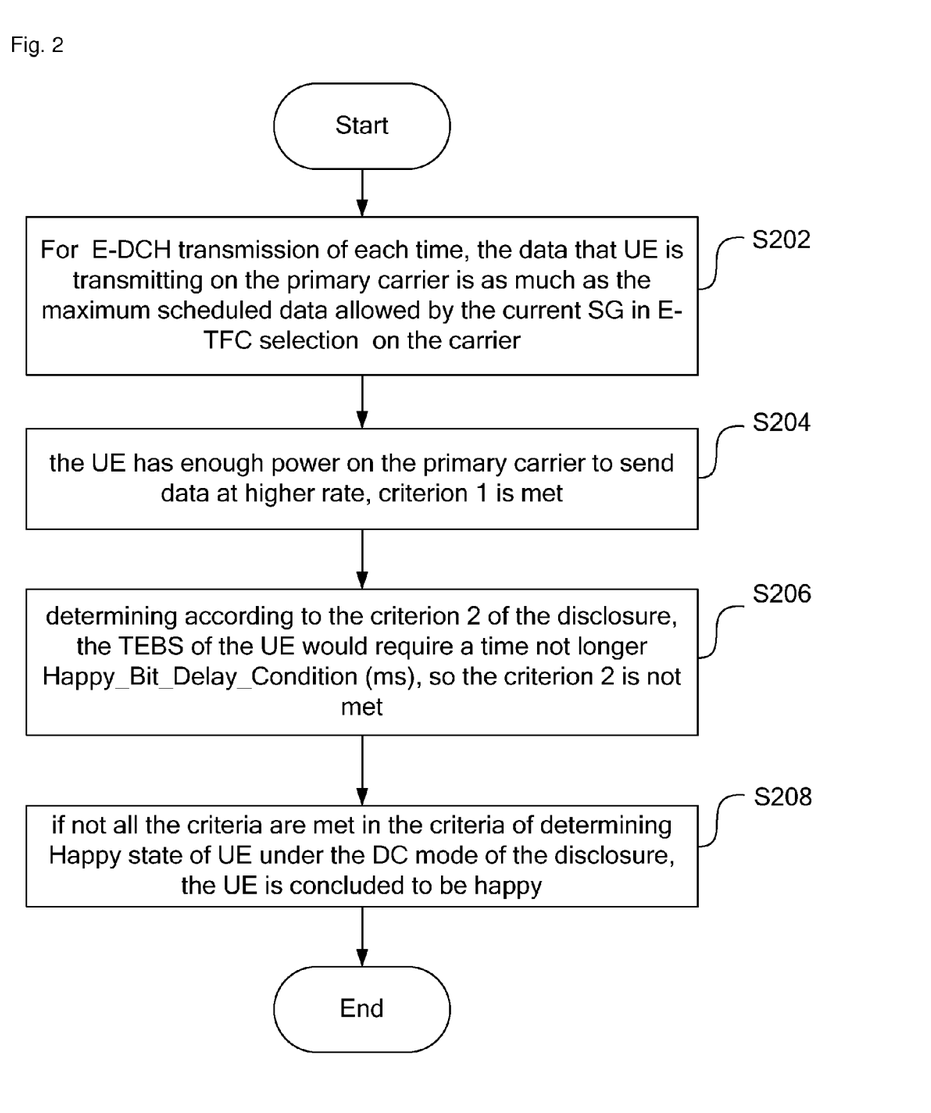
FIG. 2 is a diagram of Embodiment 2 of this disclosure.

FIG. 2 shows that data which is being sent on the primary carrier is as much as the maximum scheduled data allowed by the current SG in E-TFC selection on the carrier; under the condition that the UE has enough power on the primary carrier to send data at higher rate, for the sending of an E-DCH of each time, the UE determines the unhappy criteria of the UE according to the criteria of determining Happy state of the UE under the DC mode, if the criterion 2 is not met, then it is concluded that the UE is Happy; and the specific steps are as follows:

Step S202: for the sending of an E-DCH of each time, data that the UE is sending on the primary carrier is as much as the maximum scheduled data allowed by the current SG in an E-TFC selection;

Step S204: the UE has enough power on the primary carrier to send data at higher rate, comprehensively, the criterion 1 in the criterion of determining Happy state of the UE under the DC mode of this disclosure is met;

Step S206: determining according to the method 2 of the criterion 3 in the criteria of determining Happy state of the UE under the DC mode of this disclosure, the TEBS of the UE would require a time not longer than Happy_Bit_Delay_Condition (ms), so the criterion 2 is not met.

Step S208: if the criterion 1 in the criteria of determining Happy state of the UE under the DC mode of this disclosure is met, but the criterion 2 is not met, it can be concluded that the UE is happy.

Figure 3:
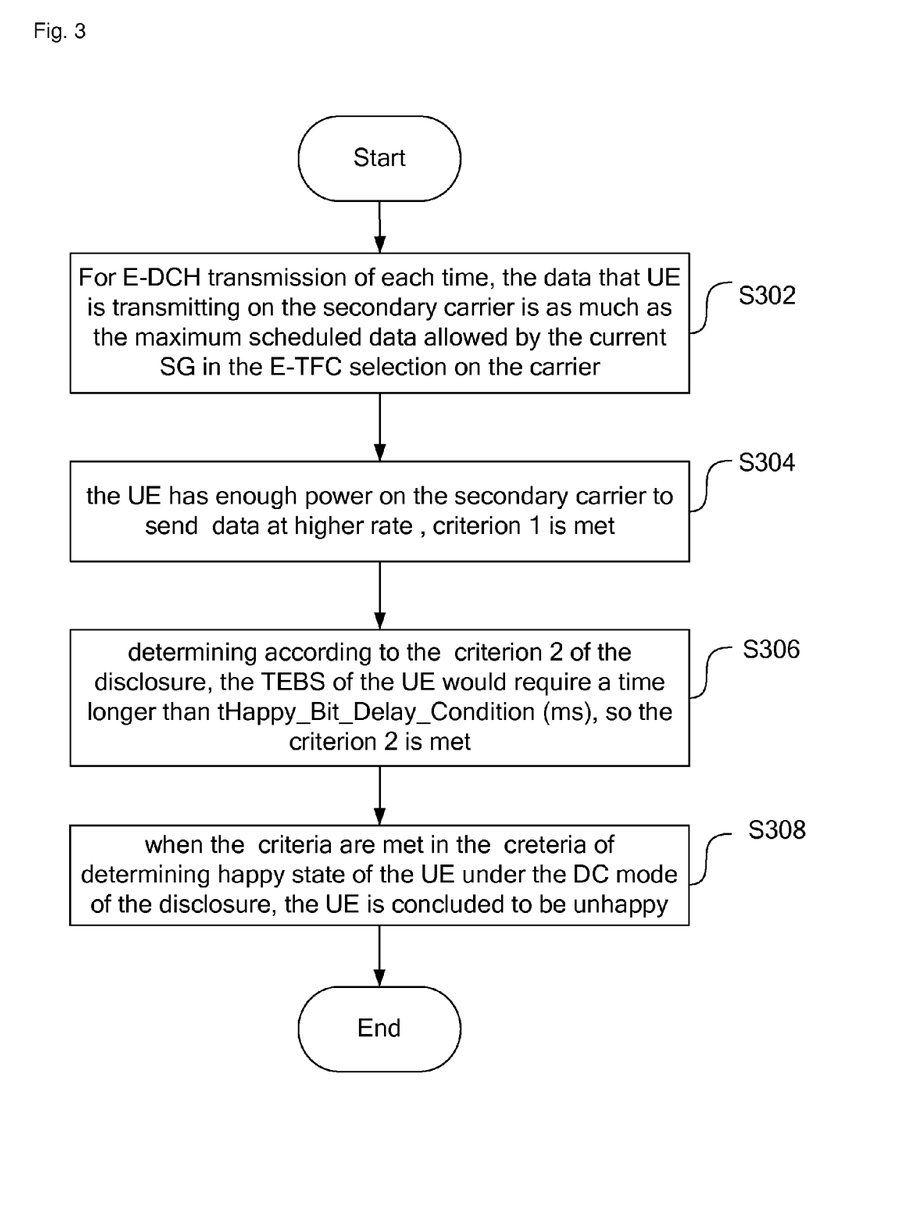
FIG. 3 is a diagram of Embodiment 3 of this disclosure.

FIG. 3 shows that data being sent on the secondary carrier is as much as the maximum scheduled data allowed by the current SG in E-TFC selection; under the condition that the UE has enough power on the secondary carrier to send data at higher rate, for the sending of an E-DCH of this time, the UE determines the unhappy criteria of the UE according to the criteria of determining Happy state of the UE under the DC mode, when the two criteria are met, it is concluded that the UE is unhappy; and the specific steps are as follows:

Step S302: for the sending of an E-DCH each time, data that the UE is sending on the secondary carrier is as much as the maximum scheduled data allowed by the current SG in an E-TFC selection;

Step S304: the UE has enough power on the secondary carrier to send data at higher rate, and the criterion 1 in the criteria of determining Happy state of the UE under the DC mode is met;

Step S306: determining according to the criterion 2 in the criteria of determining Happy state of the UE under the DC mode that the TEBS of the UE would require a time longer than Happy_Bit_Delay_Condition (ms), so the criterion 2 is met.

Step S308: when the two criteria in the criteria of determining Happy state of the UE under the DC mode are met, it is concluded that the UE is unhappy.

Figure 4:
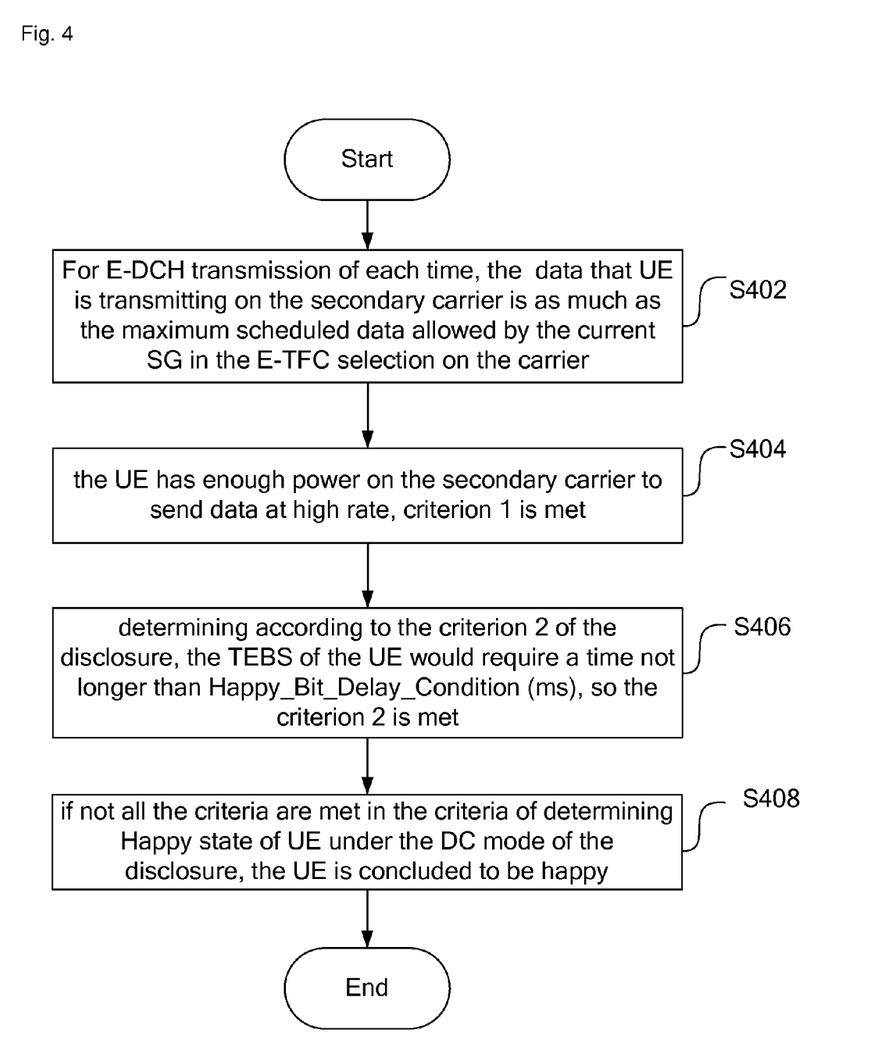
FIG. 4 is a diagram of Embodiment 4 of this disclosure.

FIG. 4 shows that data that the UE is sending on the secondary carrier is as much as the maximum scheduled data allowed by the current SG in an E-TFC selection; under the condition that the UE has enough power on the secondary carrier to send data at higher rate, for the sending of an E-DCH of this time, the UE determines the unhappy criteria of the UE according to the criteria of determining Happy state of the UE under the DC mode, if the criterion 2 is not met, it is concluded that the UE is Happy; and the specific steps are as follows:

Step S402: for the sending of an E-DCH each time, data that the UE is sending on the secondary carrier is as much as the maximum scheduled data allowed by the current SG in E-TFC selection;

Step S404: the UE has enough power on the secondary carrier to send data at higher rate, and under the DC mode of this disclosure, the criterion 1 in the criteria of determining Happy state of the UE under the DC mode is met;

Step S406: determining according to the criterion 2 in the criteria of determining Happy state of the UE under the DC mode that the TEBS of the UE would require a time not longer than Happy_Bit_Delay_Condition (ms), so the criterion 2 is not met.

Step S408: if the criterion 1 in the criteria of determining Happy state of the UE under the DC mode of this disclosure is met, but the criterion 2 is not met, it is concluded that the UE is happy.

Figure 5:
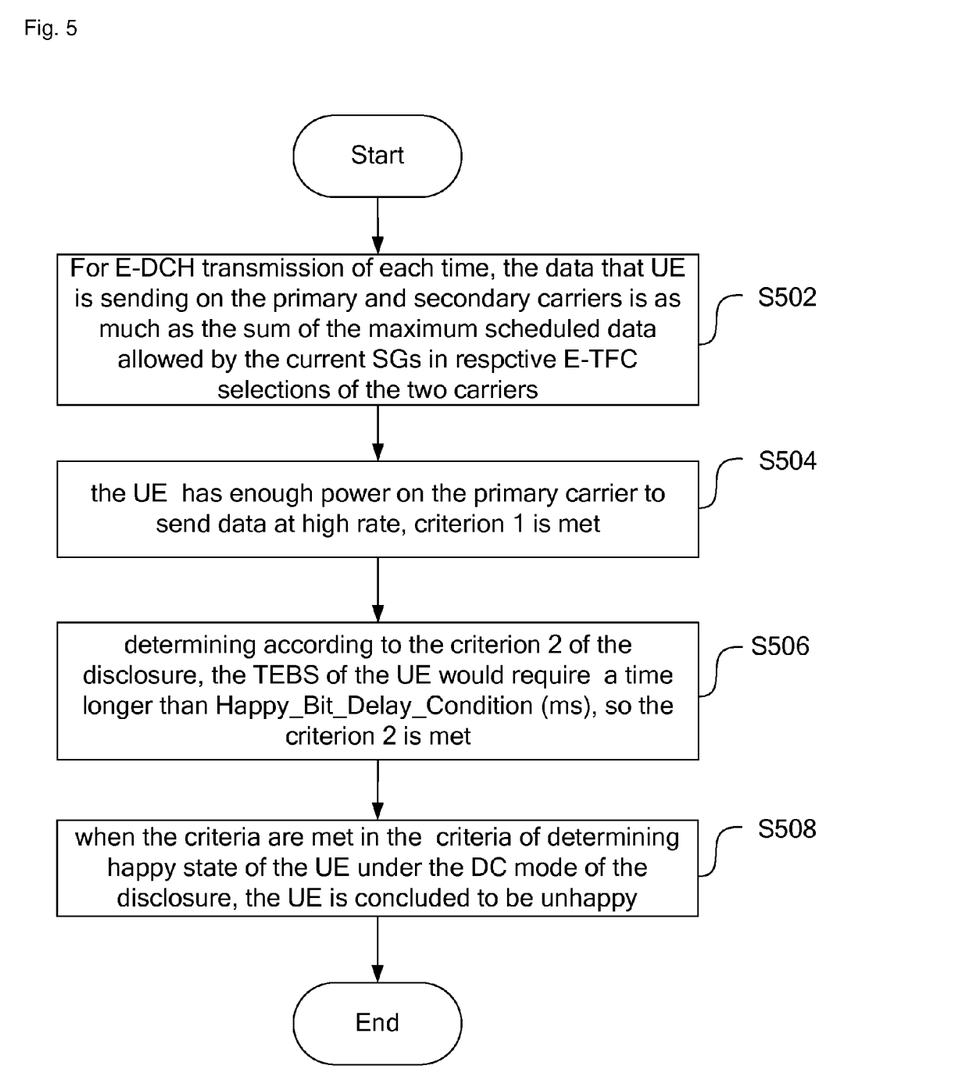
FIG. 5 is a diagram of Embodiment 5 of this disclosure.

FIG. 5 shows that data being sent on the primary and the secondary carriers is as much as the maximum scheduled data allowed by the current SG in E-TFC selection on the primary and secondary carriers; under the condition that the UE has enough power on the primary and the secondary carriers to send data at higher rate, for the sending of an E-DCH of this time, the UE determines the unhappy criteria of the UE according to the criteria of determining Happy state of the UE under the DC mode, when the two conditions are met, the UE is determined to be unhappy; and the specific steps are as follows:

Step S502: for each E-DCH transmission, the sum of data being sent on the primary carrier and data being sent on the secondary carrier is as much as the maximum scheduled data allowed by both the current SG in E-TFC selection on the primary carrier and the current SG in E-TFC selection on the secondary carrier.

Step S504: the UE has enough power on both the primary and secondary carriers to send data at higher rate, and the criterion 1 in the criteria of determining Happy state of the UE under the DC mode of this disclosure is met;

a) E-TFC of the primary carrier and E-TFC of the secondary carrier are identified, making the sum of a Transport Block 1 (TB1) size of the identified E-TFC on the primary carrier and a Transport Block 2 (TB2) size of the identified E-TFC on the secondary carrier larger than the sum of a TB1 size of a selected E-TFC on the primary carrier and a TB2 size of a selected E-TFC on the secondary carrier in a TTI same as the Happy bit by at least a given value which is greater than or equal to 16 bits; if the sum of transport block sizes of the identified E-TFCs is not larger than that of the selected E-TFCs by a given value, E-TFC of the primary carrier and E-TFC of the secondary carrier are identified, making the sum of the transport block sizes larger than the sum of transport block sizes of the selected E-TFCs of the primary and secondary carriers in a TTI same as the Happy bit by at least X bits, wherein X is the smallest RLC PDU size configured among all the logical channels which belong to scheduled MAC-d flows and have data in buffer.

b) in a TTI same as the Happy bit, data are transmitted based on a power offset same as a selected power offset in E-TFC selection, and it is checked that the identified E-TFC on the primary carrier and that on the secondary carrier are supported.

Step S506: determining according to the criterion 2 in the criteria of determining Happy state of the UE under the DC mode that the TEBS of the UE would require a time longer than Happy_Bit_Delay_Condition (ms), so the criterion 2 is met.

Step S508: when the two criteria in the criteria of determining Happy state of the UE under the DC mode are met, the UE is determined to be unhappy.

Figure 6:
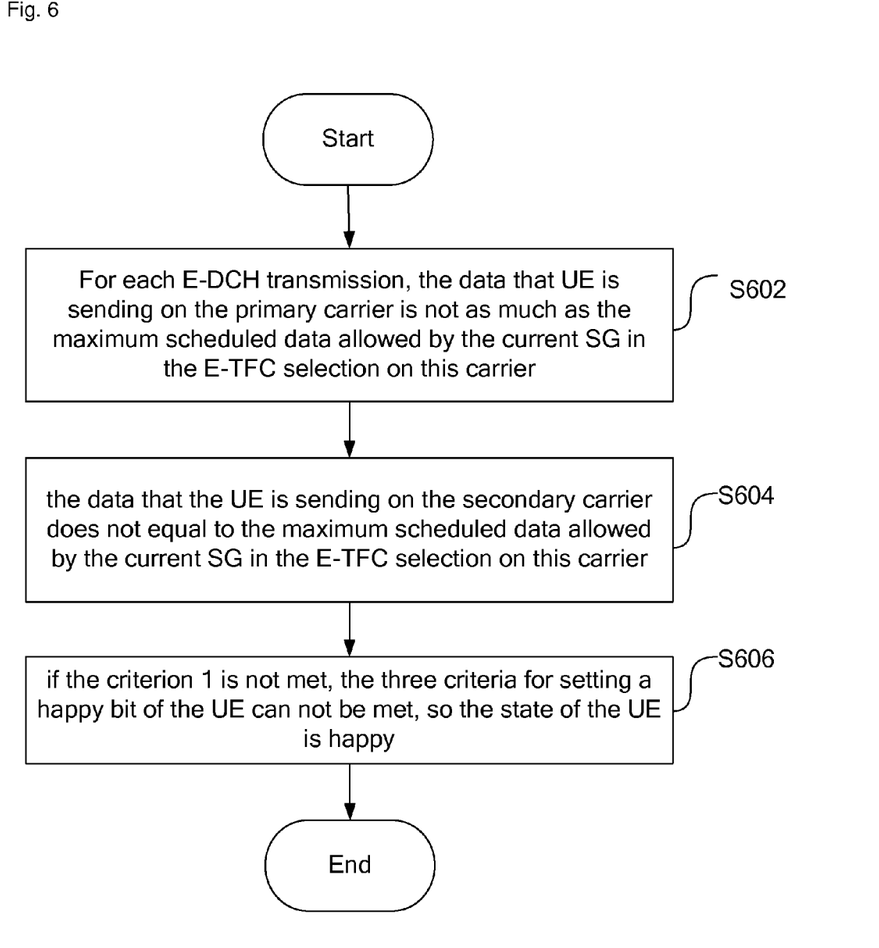
FIG. 6 is a diagram of Embodiment 6 of this disclosure.

FIG. 6 shows that neither the data being sent on the primary carrier nor that on the secondary carrier is as much as the maximum scheduled data allowed by the current SGs in E-TFC selection on the primary and secondary carriers; for the sending of an E-DCH of this time, the UE determines the unhappy criteria of the UE according to the criteria of determining Happy state of the UE under the DC mode, when the criterion 1 is not met, the UE is determined to be happy; and the specific steps are as follows:

Step S602: for each E-DCH transmission, data that the UE is sending on the primary carrier is not as much as the maximum scheduled data allowed by the current SG in an E-TFC selection on the primary carrier;

Step S604: data that the UE is sending on the secondary carrier is not as much as the maximum scheduled data allowed by the current SG in E-TFC selection on the secondary carrier;

Step S606: when the criterion 1 in the criteria of determining Happy state of the UE under the DC mode is not met, it is concluded that the UE is happy.

This disclosure further provides a UE which is configured to transmit an uplink E-DCH on more than one carrier; when the criteria below are met, the UE sets a Happy bit which is to be transmitted to a network side as "UNHAPPY" to indicate that the UE does not satisfy with the current serving grant; and the criteria include:

criterion 1: at least one carrier exists, data that the UE is transmitting on the carrier is as much as the maximum scheduled data allowed by the current serving grant in an E-TFC selection on the carrier, and the UE has enough power on the carrier to transmit data at higher rate; and criterion 2: in a TTI same as the Happy bit, data are transmitted based on a power offset the same as a power offset selected in an E-TFC selection and with the sum of transmission factors on each carrier, the transmission factors on each carrier being obtained by multiplying the ratio of the number of active hybrid automatic repeat request processes to the total number of hybrid automatic repeat request processes by the serving grant of the carrier, and the Total E-DCH Buffer Status (TEBS) would require a time longer than Happy_Bit_Delay_Condition.

Further, the UE is configured to set the Happy bit as "HAPPY" when the criterion 1 and/or criterion 2 are/is not met to indicate that the UE satisfies with the current serving grant.

Further, the UE is configured to determine that it has enough power on the carrier to send data at higher rate when the criteria a) and b) below are met:

a) if MAC-i/is configured, E-TFC of the carrier is identified, making the transport block size of the identified E-TFC on the carrier larger than that of a selected E-TFC of the carrier in a TTI same as the Happy bit by at least a given value which is greater than or equal to 16 bits; and if MAC-i/is not configured, E-TFC of the carrier is identified, making the transport block size of the identified E-TFC larger than that of a selected E-TFC of the carrier in a TTI same as the Happy bit by at least X bits, wherein X is the smallest Radio Link Control Protocol Data Unit (RLC PDU) size configured among all logical channels which belong to scheduled MAC-d flows and have data in buffer;

b) in the TTI same as the Happy bit, data are transmitted based on a power offset the same as a power offset selected in E-TFC selection, and the identified E-TFC of the carrier in the criterion a) is supported.

Further, the UE is configured to determine the UE has enough power on the primary and the secondary carriers to send data at higher rate when data being sent on the primary and the secondary carriers is as much as the maximum scheduled data allowed by the current serving grant in E-TFC selection on the corresponding carrier and when the two criteria below are met:

a) if MAC-i/is configured, E-TFC of the primary carrier and E-TFC of the secondary carrier are identified, making the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in the same TTI as the Happy bit by at least a given value which is greater than or equal to 16 bits; and if MAC-i/is not configured, E-TFC of the primary carrier and E-TFC of the secondary carrier are identified, making the sum of a first transport block size of the identified E-TFC on the primary carrier and a second transport block size of the identified E-TFC on the secondary carrier larger than the sum of a first transport block size of a selected E-TFC on the primary carrier and a second transport block size of a selected E-TFC on the secondary carrier in the same TTI as the Happy bit by at least X bits, wherein X is the smallest RLC PDU size configured among all logical channels which belong to scheduled MAC-d flows and have data in buffer; and b) in the same TTI as the Happy bit, data are transmitted based on a power offset the same as a power offset selected in E-TFC selection, and E-TFC of the primary carrier and E-TFC of the secondary carrier, which are identified in criterion a), are supported.

Further, the UE is configured to transmit data with the multiplying of the sum of serving grants of the current carriers by the ratio of the number of active hybrid automatic repeat request processes to the total number of hybrid automatic repeat request processes when the number of active HARQ processes on each carrier is same.

INDUSTRIAL APPLICABILITY

Compared with the related technologies, this disclosure synthesizes the conditions of a primary carrier and an secondary carrier to determine a Happy bit, so that the Happy state information of a UE can be reflected accurately and supplied to a NodeB to enable the NodeB to definitely know whether the UE is in happy state or in unhappy state, without causing the process to be abnormal; besides, the power control and resource scheduling processing procedure is optimized, the call-drop rate is reduced, thereby performances of the UE and the NodeB are improved.

What is claimed is:

1. A method for setting a Happy bit on an uplink E-DCH dedicated physical control channel, comprising:
    transmitting an Enhanced Dedicated Channel (E-DCH) by a User Equipment (UE) on more than one carrier, when criterion 1 and criterion 2 are met, setting a Happy bit which is to be transmitted to a network side as "UNHAPPY" by the UE to indicate that the UE does not satisfy with current serving grant; wherein the criterion 1 and criterion 2 are as follows:
    criterion 1: data that the UE is transmitting on the any one of the more than one carrier is as much as maximum scheduled data allowed by current serving grant in Enhanced Uplink Transmission Format Combination (E-TFC) selection on the carrier, and the UE has enough power on the any one of the more than one carrier to transmit data at higher rate; and criterion 2: in a Transmission Time Interval (TTI) same as the Happy bit, data is transmitted based on a power offset the same as a power offset selected in current E-TFC selection and with a sum of transmission factors on each carrier, the transmission factor on each carrier being obtained by multiplying the serving grant of the carrier by a ratio of number of active hybrid automatic repeat request processes to a total number of hybrid automatic repeat request processes, and Total E-DCH Buffer Status (TEBS) would require a time longer than Happy Bit Delay_Condition;

wherein the more than one carrier includes a primary carrier and an secondary carrier, wherein data that the UE is transmitting on the primary carrier and the secondary carrier is respectively as much as maximum scheduled data allowed by current serving grant in E-TFC selection on the primary carrier and the secondary carrier, and the UE has enough power on the primary carrier and the secondary carrier to send data at higher rate when two criteria below are met:

a) if MAC-i/is is configured, E-TFC of the primary carrier and E-TFC of the secondary carrier are identified, making a sum of a first transport block size of the identified E-TFC on the primary carrier and a second transport block size of the identified E-TFC on the secondary carrier larger than a sum of a first transport block size of a selected E-TFC on the primary carrier and a second transport block size of a selected E-TFC on the secondary carrier in the TTI same as the Happy bit by at least a given value which is greater than or equal to 16 bits; and if MAC-i/is is not configured, E-TFC of the primary carrier and E-TFC of the secondary carrier are identified, making a sum of a first transport block size of the identified E-TFC on the primary carrier and a second transport block size of the identified E-TFC on the secondary carrier larger than a sum of a first transport block size of the selected E-TFC on the primary carrier and a second transport block size of a selected E-TFC on the secondary carrier in the TTI same as the Happy bit by at least X bits, wherein X is a smallest RLC PDU size configured among all logical channels which belong to scheduled MAC-d flows and have data in buffer; and b) in the TTI same as the Happy bit, data is transmitted based on a power offset the same as a power offset selected in E-TFC selection, and E-TFC of the primary carrier and E-TFC of the secondary carrier, which are identified in criterion a), are supported.

2. The method according to claim 1, further comprising:
when the criterion 1 and/or criterion 2 are/is not met, setting the Happy bit as "HAPPY" by the UE to indicate that the UE satisfies with the current serving grant.

3. The method according to claim 1, wherein
in the criterion 2, when the number of active hybrid automatic repeat request processes on each carrier is the same, the data is transmitted with multiplying of the sum of serving grants of current carriers by a ratio of the number of active hybrid automatic repeat request processes to the total number of hybrid automatic repeat request processes.

4. A User Equipment (UE), comprising: a transceiver, a processor, and a memory;
the transceiver is configured to transmit an uplink Enhanced Dedicated Channel (E-DCH) on more than one carrier;

the processor is configured to determine whether criterion 1 and criterion 2 are met according to an algorithm, and to set a Happy bit which is to be transmitted to a network side as "UNHAPPY" when criterion 1 and criterion 2 are met, so as to indicate that the UE does not satisfy with current serving grant; and the memory is configured to store data when the processor performs the algorithm and store program instructions executed by the processor;

wherein the criterion 1 and criterion 2 are as follows:

criterion 1: data that the UE is transmitting on the any one of the more than one carrier is as much as maximum scheduled data allowed by current serving grant in Enhanced Uplink Transmission Format Combination (E-TFC) selection on the carrier, and the UE has enough power on any one of the more than one carrier to transmit data at higher rate; and criterion 2: in a Transmission Time Interval (TTI) same as the Happy bit, data is transmitted based on a power offset the same as a power offset selected in current E-TFC selection and with a sum of transmission factors on each carrier, the transmission factor on each carrier being obtained by multiplying the serving grant of the carrier by a ratio of number of active hybrid automatic repeat request processes to a total number of hybrid automatic repeat request processes, and Total E-DCH Buffer Status (TEBS) would require a time longer than Happy Bit Delay_Condition;

wherein the more than one carrier includes a primary carrier and an secondary carrier, wherein the processor is configured to determine it has enough power on the primary carrier and the secondary carrier to send data at higher rate when data that the UE is transmitting on the primary carrier and the secondary carrier is respectively as much as maximum scheduled data allowed by current serving grant in E-TFC selection on the primary carrier and the secondary carrier and when the UE meets two criteria below:

a) if MAC-i/is is configured, E-TFC of the primary carrier and E-TFC of the secondary carrier are identified, making a sum of a first transport block size of the identified E-TFC on the primary carrier and a second transport block size of the identified E-TFC on the secondary carrier larger than a sum of a first transport block size of a selected E-TFC on the primary carrier and a second transport block size of a selected E-TFC on the secondary carrier in the TTI same as the Happy bit by at least a given value which is greater than or equal to 16 bits; and if MAC-i/is is not configured, E-TFC of the primary carrier and E-TFC of the secondary carrier are identified, making a sum of a first transport block size of the identified E-TFC on the primary carrier and a second transport block size of the identified E-TFC on the secondary carrier larger than a sum of a first transport block size of the selected E-TFC on the primary carrier and a second transport block size of a selected E-TFC on the secondary carrier in the TTI same as the Happy bit by at least X bits, wherein X is a smallest RLC PDU size configured among all logical channels which belong to scheduled MAC-d flows and have data in buffer;

b) in the TTI same as the Happy bit, data is transmitted based on a power offset the same as a power offset selected in E-TFC selection, the E-TFC of the primary carrier and the E-TFC of the secondary carrier, which are identified in criterion a), are supported.

5. The UE according to claim 4, wherein
when the criterion 1 and/or criterion 2 are/is not met, the processor is configured to set the Happy bit as "HAPPY" to indicate that the UE satisfies with the current serving grant.

6. The UE according to claim 4, wherein
when the number of active hybrid automatic repeat request processes on each carrier is the same, the transceiver is configured to transmit data with multiplying of the sum of serving grants of current carriers by a ratio of the number of active hybrid automatic repeat request processes to the total number of hybrid automatic repeat request processes.

* * * * *